US012027291B2

(12) United States Patent
Akahane et al.

(10) Patent No.: US 12,027,291 B2
(45) Date of Patent: Jul. 2, 2024

(54) CHIP COMPONENT

(71) Applicant: KOA CORPORATION, Nagano (JP)

(72) Inventors: Yasushi Akahane, Nagano (JP); Nobuhiko Tamada, Nagano (JP)

(73) Assignee: KOA CORPORATION, Nagano (JP)

( * ) Notice: Subject to any disclaimer, the term of this patent is extended or adjusted under 35 U.S.C. 154(b) by 213 days.

(21) Appl. No.: 17/769,855

(22) PCT Filed: Sep. 24, 2020

(86) PCT No.: PCT/JP2020/036054
§ 371 (c)(1),
(2) Date: Apr. 18, 2022

(87) PCT Pub. No.: WO2021/075221
PCT Pub. Date: Apr. 22, 2021

(65) Prior Publication Data
US 2022/0392673 A1 Dec. 8, 2022

(30) Foreign Application Priority Data
Oct. 18, 2019 (JP) ................................ 2019-191453

(51) Int. Cl.
*H01C 1/14* (2006.01)

(52) U.S. Cl.
CPC ..................................... *H01C 1/14* (2013.01)

(58) Field of Classification Search
CPC ....................................................... H01C 1/14
See application file for complete search history.

(56) References Cited

U.S. PATENT DOCUMENTS 3,555,376 A * 1/1971 Nitta .................... H01C 17/288 257/766
6,531,806 B1 3/2003 Daidai
2015/0357097 A1 12/2015 Tsai

FOREIGN PATENT DOCUMENTS

JP S58107605 A 6/1983
JP H03214601 A 9/1991
JP H07230904 A 8/1995
JP H10223403 * 8/1998
JP H10223403 A 8/1998
JP H1167588 A 3/1999
(Continued)

OTHER PUBLICATIONS

JP-H10223403, machine translation. (Year: 1998).*
(Continued)

*Primary Examiner* — Kyung S Lee
(74) *Attorney, Agent, or Firm* — von Briesen & Roper, s.c.

(57) ABSTRACT

A chip component comprises: an insulating substrate on which a resistor serving as a functional element is formed; a pair of internal electrodes (front electrodes, end surface electrodes, and back electrodes) that is formed to cover both end portions of the insulating substrate and connected to the resistor; a barrier layer that is formed on a surface of each of the internal electrodes and mainly composed of nickel; and an external connection layer that is formed on a surface of the barrier layer and mainly composed of tin, and the barrier layer is composed of alloy plating (Ni—P) including nickel and phosphorus, which is formed by electrolytic plating, and a content ratio of phosphorus relative to nickel is set in a range of 0.5% to 5% so that the barrier layer has magnetism.

3 Claims, 3 Drawing Sheets

(56) References Cited

FOREIGN PATENT DOCUMENTS

| | | | |
|---|---|---|---|
| JP | H11224809 | A | 8/1999 |
| JP | 001060843 | A | 3/2001 |
| JP | 2001060843 | A | 3/2001 |
| JP | 2001110601 | A | 4/2001 |
| JP | 2001274539 | A | 10/2001 |
| JP | 2019117900 | A | 7/2019 |

OTHER PUBLICATIONS

International Preliminary Report related to Application No. PCT/JP2020/036054 reported on Apr. 28, 2022.

Japanese Office Action related to Application No. 2019-191453 reported on Aug. 30, 2023.

* cited by examiner

CHIP COMPONENT

This patent application is a 35 USC § 371 U.S. national stage of International Application No. PCT/JP2020/036054 filed Sep. 24, 2020, which claims the benefit and priority of Japanese Application No. 2019-191453 filed on Oct. 18, 2019 the disclosures of which are incorporated in their entirety by reference herein.

TECHNICAL FIELD

The present invention relates to a surface-mounting chip component on which external electrodes for soldering are provided at both end portions of a component main body, in particular, relates to a terminal electrode structure including the external electrodes.

BACKGROUND ART

A chip resistor, which is one of the examples of a chip component, mainly includes a rectangular parallelepiped insulating substrate (component main body), a pair of front electrodes that is arranged on the front surface of the insulating substrate to face each other with a predetermined interval therebetween, a resistor (functional element) that bridges between the pair of front electrodes, a protective film that covers the resistor, a pair of back electrodes that is arranged on the back surface of the insulating substrate to face each other with a predetermined interval therebetween, a pair of end surface electrodes each of which bridges the corresponding front electrode and back electrode, and a pair of external electrodes that is formed at both end portions of the insulating substrate, respectively, and each of which covers the corresponding front electrode, back electrode, and end surface electrode.

The corresponding front electrode, back electrode, and end face electrode serve as an internal electrode, and each electrode is formed by a material comprising silver (Ag) or copper (Cu) as a main component. Each of the external electrodes includes a barrier layer mainly composed of nickel (Ni) to be deposited on the surface of the internal electrode, and an external connection layer mainly composed of tin (Sn) to be deposited on the surface of the barrier layer. The barrier layer and the external connection layer are formed by electrolytic plating.

In the case of mounting the chip resistor having such a structure on a circuit board, after applying the solder pastes to a land of a wiring pattern provided on the circuit board, the chip resistor is placed on the circuit board such that each of the external connection layers overlaps the solder pastes. Melting and solidifying the solder pastes in this state causes each of the external connection layer to be soldered to the land. As a solder material, for example, a material called eutectic solder in which tin (Sn) and lead (Pb) are mixed at a ratio of about 6:4 (Sn63%-Pb37%) is used. Although the melting point of the eutectic solder having such a composition is 183° C., in order to melt the solder, it is necessary to apply heat at the melting point or higher. Accordingly, a phenomenon that Ag and Cu constituting an internal electrode melt due to the heat at the time of soldering, which is so-called "solder leaching", may occur.

In order to prevent the solder leaching, a barrier layer formed by nickel plating is provided. It has been known that a nickel-plating layer having the thickness of 2 μm or more can effectively prevent the solder leaching. However, a thick nickel-plating layer (especially 15 μm or more) is easily peeled off from the insulating substrate by an external stress, which may cause problems such as disconnection due to peeling, and sulfidation of the peeled off portion due to corrosion gas. With regard to the above, conventionally, as described in Patent Literature 1, it has been proposed a terminal electrode structure in which, after performing strike-plating of gold (Au) on the internal electrode of the chip resistor, a nickel-plating layer (barrier layer) and a tin-plating layer (external connection layer) are sequentially formed so as to increase the adhesion of the nickel-plating layer constituting the barrier layer.

CITATION LIST

Patent Literature

Patent Literature 1: JP-A-H07-230904

SUMMARY OF INVENTION

Technical Problem

In recent years, lead free has been recommended in respect of global environmental protection, and thus the one which is called lead-free solder containing almost no lead has been used. Here, for example, in the case of using the lead-free solder having the composition of Sn96.5%-Ag3%-Cu0.5%, since the melting point of this lead-free solder is 220° C. and the heating temperature at the time of soldering is higher as compared with the case of using the eutectic solder, nickel constituting the barrier layer easily melts into the solder material side. Accordingly, it is necessary to prevent the solder leaching by thickening the nickel-plating layer, however, a thick nickel-plating layer is easily peeled off. In this way, it is difficult to prevent both the solder leaching and solder peeling, and in addition, thickening a nickel-plating layer increases a plating time and material cost. In this connection, as in the case of the terminal electrode structure according to Patent Literature 1, performing the process of the strike-plating of gold as an underlayer plating of the nickel-plating layer can increase the adhesion of the nickel-plating layer, which increases, however, the cost therefor.

The present invention has been made in view of the circumstances of the prior art described above, and the object of the present invention is to provide a chip component including a terminal electrode structure capable of preventing both solder leaching and solder peeling.

Solution to Problem

In order to achieve the object descried above, the present invention provides a chip component comprising: a component main body on which a functional element is formed; a pair of internal electrodes that is formed to cover both end portions of the component main body and connected to the functional element; a barrier layer that is formed on a surface of each of the pair of internal electrodes and mainly composed of nickel; and an external connection layer that is formed on a surface of the barrier layer and mainly composed of tin, wherein the barrier layer is composed of alloy plating including nickel and phosphorus, which is formed by electrolytic plating, and a content of phosphorus in the alloy plating is set so that the barrier layer has magnetism.

According to the chip component having the structure described above, the barrier layer serving as an underlayer of the external connection layer is formed of alloy plating (Ni—P) comprising nickel (Ni) as a main component and containing phosphorus (P), and since using alloy plating makes diffusion into tin slower as compared with using nickel, it is possible to prevent the solder leaching under high temperature even without forming the barrier layer too thick. Furthermore, since the content of phosphorus is set so that the barrier layer has magnetism, it is possible to use the magnetic properties thereof to, for example, perform magnetic sorting in a product inspection process and stabilize the posture of the product by magnetism in a taping process of storing the product in a tape-like package or at the time of taking out the product from the package and mounting it on a circuit board.

In the chip component having the structure described above, the larger the content of phosphorus in alloy plating is, the more an effect of suppressing the diffusion is improved, however, increase in the content of phosphorus causes loss of magnesium of the barrier layer. Accordingly, the content ratio of phosphorus relative to nickel of the barrier layer is preferably set to fall within the range of 0.5% to 5%.

Furthermore, in the case where the thickness of the barrier layer is set in a range of 2 μm to 15 μm, it is possible to suppress the time and material cost required for a plating process of the barrier layer.

Furthermore, in the case where the barrier layer is composed of a double layer structure including an inner plating layer formed of nickel, and an outer plating layer containing phosphorus in nickel, it is possible to realize the barrier layer having both magnetic properties and heat resistance properties since the inner plating layer containing no phosphorus ensures the magnetism while the outer plating layer containing phosphorus suppresses solder leaching under high temperature.

Advantageous Effects of Invention

According to the chip component of the present invention, it is possible to prevent both solder leaching and solder peeling of a barrier layer formed as an underlayer of an external connection layer, and also stably perform such as an inspection process and a taping process of a product by using the magnetic properties provided in the barrier layer.

DESCRIPTION OF EMBODIMENTS

Figure 1:
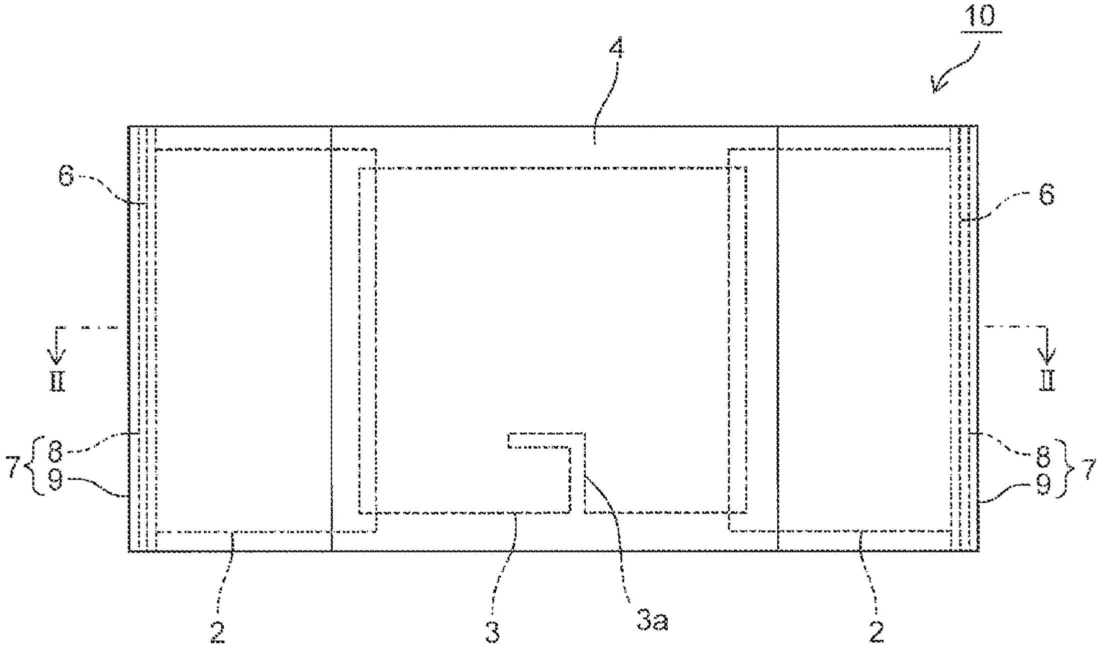
FIG. 1 is a plan view of a chip resistor according to a first embodiment of the present invention.
Figure 2:
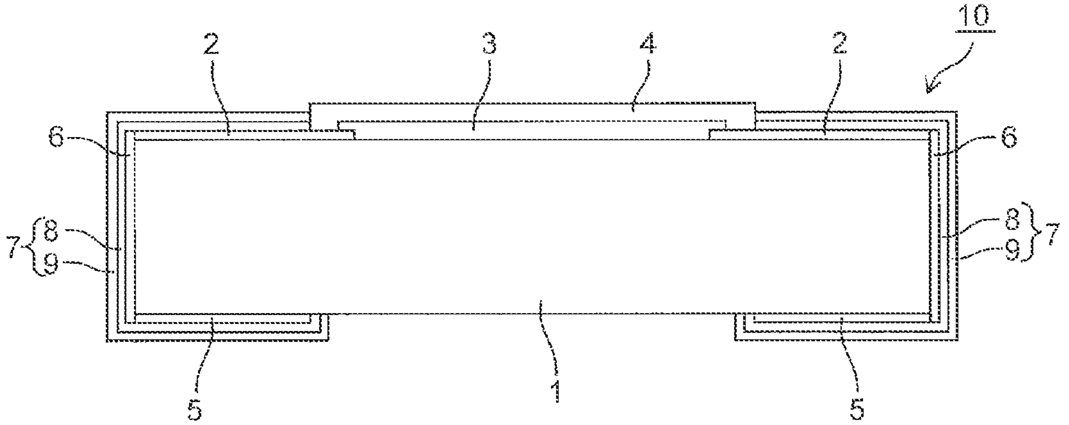
FIG. 2 is a cross-sectional view taken along the line II-II of FIG. 1.

Hereinafter, embodiments of the present invention will be described with reference to the drawings. FIG. 1 is a plan view of a chip resistor 10 according to a first embodiment of the present invention. FIG. 2 is a cross-sectional view taken along the line II-II of FIG. 1.

As illustrated in FIG. 1 and FIG. 2, the chip resistor 10 according to the first embodiment, which is one of the examples of a chip component, mainly includes a rectangular parallelepiped insulating substrate 1, a pair of front electrodes 2 that is formed at both ends in the longitudinal direction on the front surface of the insulating substrate 1, respectively, a resistor 3 that is formed so as to bridge between the pair of front electrodes 2, a protective layer 4 that covers the entire of the resistor 3 and a part of the front electrodes 2, a pair of back electrodes 5 that is formed at both ends in the longitudinal direction on the back surface of the insulating substrate 1, respectively, a pair of end surface electrodes 6 that is formed on both end surfaces in the longitudinal direction of the insulating substrate 1 to connect one of the front electrodes 2 and one of the back electrodes 5 corresponding thereto to be conductive, respectively, and a pair of external electrodes 7 that covers the one of the front electrodes 2 and one of the back electrodes 5 and one of the end surface electrodes 6, which are corresponding to each other, respectively.

The insulating substrate 1 is a component main body formed of such as ceramics. The insulating substrate 1 is obtained by dividing a sheet-shaped and large-sized substrate into multiple pieces along a primary division groove and a secondary division groove which extend vertically and horizontally, respectively.

Each of the front electrodes 2 is formed in a rectangular shape. The front electrodes 2 are formed on the opposite short sides of the insulating substrate 1, respectively, with a predetermined interval therebetween. The pair of front electrodes 2 is obtained by screen-printing the Ag pastes and drying and firing the printed pastes.

The resistor 3 is a functional element, and obtained by screen-printing the resistive pastes such as ruthenium oxide and drying and firing the printed pastes. The resistor 3 is formed in a rectangular shape in a plan view, and both ends of the resistor 3 in the longitudinal direction overlap the front electrodes 2, respectively. Note that a trimming groove 3*a* is formed on the resistor 3, which is provided to adjust a resistance value of the resistor 3.

The protective layer 4 is composed of a double layer structure including an undercoat layer and an overcoat layer. The undercoat layer is obtained by screen-printing and firing the glass pastes, and is formed so as to cover the resistor 3 before the trimming groove 3*a* is formed. The overcoat layer is obtained by screen-printing the epoxy resin pastes and heating and curing the printed pastes, and is formed, after the trimming groove 3*a* is formed on the resistor 3 from above the undercoat layer, so as to entirely cover the resistor 3 including the trimming groove 3*a* and the undercoat layer.

Each of the back electrodes 5 is formed in a rectangular shape. The back electrodes 5 are formed on the back surface of the insulating substrate 1 at positions corresponding to the positions of the front electrodes 2, respectively, with a predetermined interval therebetween. The pair of back electrodes 5 is obtained by screen-printing the Ag pastes and drying and firing the printed pastes.

The pair of end surface electrodes 6 is obtained by sputtering Ni—Cr on the end surfaces of the insulating substrate 1, or applying the Ag pastes on the end surfaces of the insulating substrate 1 and heating and curing the applied pastes, respectively. Each of the electrodes 6 is formed so as to connect one of the front electrodes 2 and one of the back electrodes 5, which are corresponding to each other, to be conductive. The corresponding front electrode 2, end electrode 6, and back electrode 5 serve as an internal electrode having a U-shaped cross section.

Each of the external electrodes 7 includes a barrier layer 8 that is deposited on the surface of the internal electrode (front electrode 2, end surface electrode 6, and back electrode 5), and an external connection layer 9 that is deposited on the surface of the barrier layer 8. The barrier layer 8 and the external connection layer 9 are formed by electrolytic plating. The barrier layer 8 is an alloy-plating layer (Ni—P plating layer) comprising nickel (Ni) as a main component and containing phosphorus (P), and the thickness thereof is set in the range of 2 μm~15 μm. Here, the content ratio of phosphorus relative to nickel in the barrier layer 8 is set in the range of 0.5% to 5% so that the barrier layer 8 has magnetism. The external connection layer 9 is a Sn-plating layer comprising tin (Sn) as a main component, and the thickness thereof is set in the range of 2 μm~15 μm.

Figure 3:
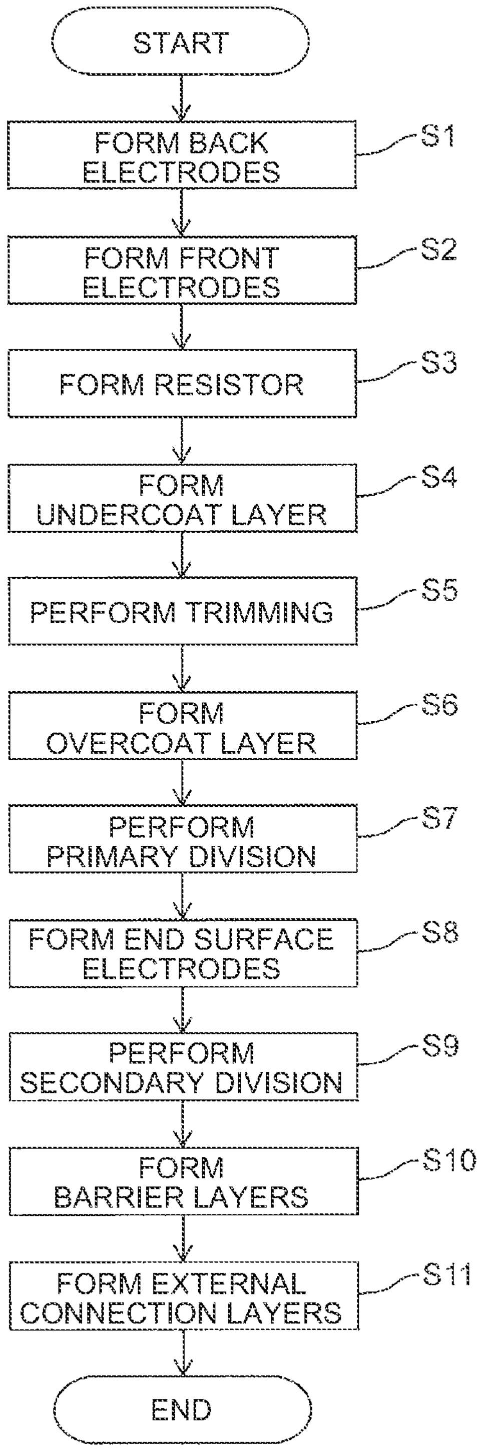
FIG. 3 is a flowchart of a manufacturing process of the chip resistor.

Next, a method of manufacturing the chip resistor 10 according to the first embodiment having the structure described above will be described with reference to a flowchart illustrated in FIG. 3.

The preliminary step is to prepare a large-sized substrate from which multi-piece insulating substrates 1 are obtained. In the large-sized substrate, the primary division groove and the secondary division groove are provided to form a grid pattern, and each one of the grids divided by the primary division groove and the secondary division groove serves as a single chip region. As illustrated in FIG. 3, the following steps which will be described later are collectively performed on the above-described large-sized substrate.

The first step is to screen-print the Ag pastes on the back surface of the large-sized substrate and dry the printed pastes so as to form the pair of back electrodes 5, which faces each other with a predetermined interval therebetween, at both ends in the longitudinal direction of each chip forming region (step S1).

The next step is to screen-print the Ag—Pd pastes on the front surface of the large-sized substrate and dry the printed pastes so as to form the pair of front electrodes 2, which faces each other at a predetermined interval therebetween, at both ends in the longitudinal direction of each chip forming region (step S2). Thereafter, the step of firing the front electrodes 2 and the back electrodes 5 simultaneously at a high temperature of about 850° C. is performed. Note that the front electrodes 2 and the back electrodes 5 may be fired individually, and moreover, the front electrodes 2 may be formed before the back electrodes 5 are formed by reversing the order of formation thereof.

The next step is to screen-print the resistive pastes containing ruthenium oxide or the like on the front surface of the large-sized substrate and dry the printed pastes so as to form the resistor 3 whose both ends overlap the front electrodes 2, respectively, and then fire the resistor 3 at a high temperature of about 850° C. (step S3).

The next step is to screen-print the glass pastes on an area covering the resistor 3 and dry the printed pastes so as to form the undercoat layer covering the resistor 3, and thereafter, fire the undercoat layer at a temperature of about 600° C. (Step S4).

The next step is to irradiate a laser beam from above the undercoat layer while measuring a resistance value of the resistor 3 by abutting a probe to the pair of front electrodes 2 so as to form the trimming groove 3*a* on the resistor 3, whereby the resistance value is adjusted (step S5).

The next step is to screen-print the epoxy-based resin pastes from above the undercoat layer, and thereafter, heat and cure the printed pastes at a temperature of about 200° C. so as to form the overcoat layer (step S6). Thus, the protective layer 4 that is composed of a double layer structure including the undercoat layer and the overcoat layer is formed.

The next step is to, after primarily dividing the large-sized substrate into the strip-shaped substrates along the primary division groove (step S7), sputter Ni/Cr on divided surfaces of each strip-shaped substrate so as to form the end surface electrodes 6 for connecting between the front electrodes 2 and the back electrodes 5 which are provided on both the front and back surfaces of each strip-shaped substrate, respectively (step S8). The end surface electrodes 6 may be formed by, instead of sputtering Ni/Cr, applying the Ag-based pastes on the divided surfaces of each strip-shaped substrate and heating and curing the applied pastes.

The next step is to, after secondarily dividing the strip-shaped substrates into a plurality of chip-shaped substrates along the secondary division groove (step S9), perform electrolytic plating on these chip-shaped substrates so as to form the barrier layers 8 covering the internal electrodes (front electrodes 2, end surface electrodes 6, and back electrodes 5) at both end portions of each chip-shaped substrate, respectively (step S10). Each of the barrier layers 8 is formed of alloy-plating (Ni—P plating layer) comprising nickel (Ni) as a main component and containing phosphorus (P), and the thickness thereof is set in the range of 2 μm to 15 μm. Here, in the alloy plating constituting the barrier layer 8, the larger the content of phosphorus contained in nickel is, the more the diffusion into tin constituting the external connection layer 9 to be formed in the next step can be suppressed. However, since increase in the content of phosphorus causes loss of magnesium of the barrier layer 8, the content ratio of phosphorus relative to nickel of the barrier layer 8 is set to fall within the range of 0.5% to 5%.

The next step is to perform electrolytic plating on each chip-shaped substrate so as to form the external connection layers 9 for covering the surfaces of the barrier layers 8, respectively (step S11). Each of the external connection layer 9 is a Sn plating layer mainly composed of tin (Sn), and the thickness thereof is set in the range of 2 μm~15 μm. Thus, the external electrodes 7 each of which is composed of a double layer structure including the barrier layer 8 and the external connection layer 9 is formed, and the plurality of chip resistors 10 as illustrated in FIG. 1 and FIG. 2 are obtained.

As described above, in the chip resistor 10 according to the first embodiment, the barrier layer 8 serving as an underlayer of the external connection layer 9 composed of a tin plating layer is formed of alloy-plating (Ni—P) comprising nickel as a main component and containing phosphorus, and since using alloy plating makes diffusion into tin slower as compared with using nickel, it is possible to prevent the solder leaching under high temperature even without forming the barrier layer 8 too thick. In addition, since the content ratio of phosphorus relative to nickel is set in the range of 0.5% to 5% in order to prevent the loss of magnetism of the barrier layer 8, it is possible to use the magnetic properties of the barrier layer 8 to, for example, perform magnetic sorting in a product inspection process and stabilize the posture of the product by magnetism in a taping process of storing the product in a tape-like package or at the time of taking out the product from the package and mounting it on a circuit board.

Figure 4:
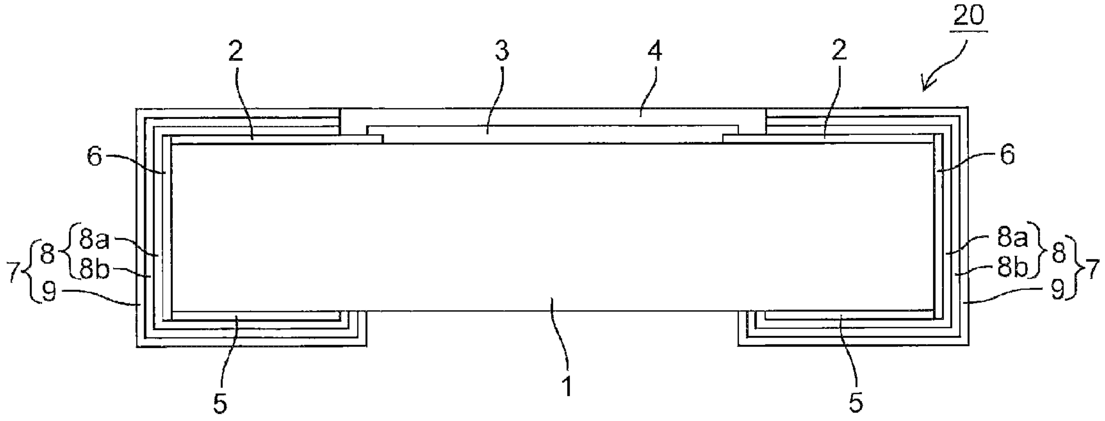
FIG. 4 is a cross-sectional view of a chip resistor according to a second embodiment of the present invention.

FIG. 4 is a cross-sectional view of a chip resistor 20 according to a second embodiment of the present invention. In FIG. 4, portions corresponding to those in FIG. 2 are provided with the same reference signs.

As illustrated in FIG. 4, the chip resistor 20 according to the second embodiment differs from the chip resistor 10 according to the first embodiment in that the barrier layer 8 is composed of a double layer structure including an inner plating layer 8*a* comprising only nickel, and an outer plating layer 8*b* containing phosphorus in nickel while the other structures are basically the same. Preferably, the content ratio of phosphorus relative to nickel in the outer plating layer 8*b* is set in the range of 0.5% to 5%.

In the chip resistor 20 according to the second embodiment designed in the manner described above, since the inner plating layer 8*a* containing no phosphorus ensures the magnetism while the outer plating layer 8*b* containing phosphorus suppresses the solder leaching under high temperature, it is possible to easily form the barrier layer 8 having both magnetic properties and heat resistance properties.

In each of the embodiments described above, the case where the present invention is applied to the chip resistor having the resistor 3 as a functional element has been described. Meanwhile, the present invention is also applicable to a chip component having a functional element other than the resistor, for example, an inductor or a capacitor.

REFERENCE SIGNS LIST

1 insulating substrate (component main body)
2 front electrode (internal electrode)
3 resistor (functional element)
4 protective layer
5 back electrode (internal electrode)
6 end surface electrode (internal electrode)
7 external electrode
8 barrier layer
8*a* inner plating layer
8*b* outer plating layer
9 external connection layer
10, 20 chip resistor (chip component)

The invention claimed is:

1. A chip component comprising:

a component main body on which a functional element is formed;

a pair of internal electrodes that is formed to cover both end portions of the component main body and connected to the functional element;

a barrier layer that is formed on a surface of each of the pair of internal electrodes and mainly composed of nickel; and an external connection layer that directly covers a surface of the barrier layer and mainly composed of tin, wherein the barrier layer is composed of alloy plating including nickel and phosphorus formed by electrolytic plating, in which a content ratio of phosphorus relative to nickel is set to a range from 0.5% to 5%, and a content of phosphorus in the alloy plating is set so that the barrier layer has magnetism.

2. The chip component according to claim 1, wherein a thickness of the barrier layer is set in a range of 2 μm to 15 μm.

3. The chip component according to claim 1, wherein the barrier layer is composed of a double layer structure including an inner plating layer formed of nickel, and an outer plating layer containing phosphorus in nickel.

* * * * *